Patented July 7, 1953

2,644,833

UNITED STATES PATENT OFFICE 2,644,833

ALKANOLAMINE SULFATES OF HYDROXY ETHERS

Milton Kosmin, Dayton, Ohio, assignor to Monsanto Chemical Company, St. Louis, Mo., a corporation of Delaware No Drawing. Application April 16, 1951, Serial No. 221,319

8 Claims. (Cl. 260—458)

The present invention relates to compounds having high surface-activity in aqueous solutions and to processes for preparing the said compounds.

In my copending application Serial No. 179,384 filed August 14, 1950, I have disclosed alkali metal or ammonium sulfates of certain 2-butyloctanol-1-ethylene oxide condensates. These products are produced by condensing ethylene oxide with 2-butyloctanol-1, sulfating the condensate and neutralizing the resulting sulfated product with an alkali metal or ammonium hydroxide. While the alkali metal or ammonium salts thus obtained show very good detergency, they are not sufficiently soluble in water to permit the preparation of aqueous solutions having a concentration of more than, say, 50% of condensate. Hence they cannot be used for the preparation of liquid detergents of adequate sudsing properties.

I have now found that if at least 3, but less than 11 moles of ethylene oxide be condensed with 2-butyloctanol-1 and the resulting hydroxy ethers are converted to certain alkanolamine sulfates there is obtained a series of water-soluble products which exhibits very good wetting-out and detergency properties. Concentrated aqueous solutions of the present products may be made to yield liquid detergents of very good sudsing properties.

The present products are prepared by condensing ethylene oxide with 2-butyloctanol-1 until at least 3 moles, but not in excess of 11 moles, have been condensed with the alcohol and then sulfating and neutralizing the resulting condensation product with certain alkylolamines. The condensation may be carried out by mixing ethylene oxide either as gas or liquid with the alcohol and heating to a temperature of from 110 to 170° C. The condensation reaction is aided by the presence of a catalyst. For this purpose any alkaline materials, such as an alkali metal hydroxide or alcoholate may be used. The catalyst may be employed in relatively small amounts, usually from 0.5% to 1% being employed. The catalyst is added to the liquid alcohol at the beginning of the reaction. Sulfation of the alcohol-ethylene oxide condensate may be effected in known manner; for example, by reaction with dilute or concentrated sulfuric acid, oleum, sulfur trioxide, chlorosulfonic acid, etc. The sulfuric acid esters thus obtained are then neutralized, i. e., converted to salts by treatment with an alkanolamine having the general formula

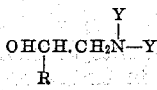

in which R is selected from the class consisting of hydrogen and the methyl radical and Y is selected from the class consisting of hydrogen and the radical

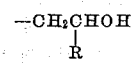

Alkanolamines having the above general formula are ethanolamine, diethanolamine, triethanolamine, isopropanolamine, diisopropanolamine and triisopropanolamine.

The products so produced are alkanolamine sulfates of hydroxy ethers and are believed to have the structure:

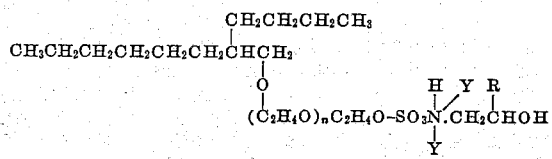

in which $n$ is an integer having a value of at least 2, but not in excess of 10, R is selected from the class consisting of hydrogen and the methyl radical, and Y is selected from the class consisting of hydrogen and the radical

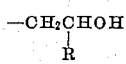

The following examples will further illustrate this invention:

Example 1

1015 g. (5.457 moles) of 2-butyloctanol-1 was placed in a glass flask, 10.1 g. of powdered KOH added and the contents then heated to 130° C. A stream of gaseous ethylene oxide was passed into the alcohol by means of a gas dispersing tube and the stream continued until 741 g. of ethylene oxide had combined. The mass became hot due to the exothermic reaction heat and the temperature was controlled by cooling the flask by the application of cold water to the exterior. In this way the temperature was maintained at 145–150° C. during the progress of the reaction.

424 g. of this condensation product was dissolved in approximately 1300 ml. of liquid sulfur dioxide and to this there was added, dropwise, 123 g. of sulfur trioxide, at a temperature of from 65° C. to 70° C. and during a period of about 2 hours. The resulting solution was then stirred until most of the sulfur dioxide had evaporated. 300 ml. of 95% ethanol was then added and the whole was stirred under full water pump vacuum to remove sulfur dioxide. The product thus obtained consisted of an ethanol solution of the sulfated triethylene glycol ether of 2-butyloctanol-1.

A portion of the sulfated product obtained above was treated with monoethanolamine. The neutralized material was then dried in a stirred reactor at a pot temperature of 70–75° C./13–15 mm. The dried product was the substantially pure monoethanolamine salt of sulfated triethylene glycol ether of 2-butyloctanol-1, a viscous liquid. It is designated as I–1 in the tests reported in Example 3.

Neutralization of another portion of the sulfated triethylene glycol ether of 2-butyloctanol-1 obtained above with diethanolamine, and subsequent drying as above, gave the diethanolamine salt of sulfated triethylene glycol ether of 2-butyloctanol-1, a viscous liquid. This compound is designated as I–2 in tests reported in Example 3.

Neutralization of still another portion of the sulfated triethylene glycol ether obtained above with triethanolamine, and subsequent drying, gave the triethanolamine salt of sulfated triethylene glycol ether of 2-butyloctanol-1, a viscous liquid. This compound is designated as I–3 in tests reported in Example 3.

Example 2

A portion of the 2-butyloctanol-1 ethylene oxide condensation product obtained in Example 1, weighing 715 g., was further treated with 213 g. of ethylene oxide using the same apparatus as described above. The product obtained corresponded to the pentaethylene glycol ether of 2-butyloctanol-1. 409 g. of this product was dissolved in approximately 1300 ml. of liquid sulfur dioxide, and to this there was slowly dropped 92 g. of sulfur trioxide, at a temperature of 55° C. and during a period of about 2 hours. The sulfur dioxide was then evaporated from the reaction mixture by stirring at atmospheric pressure. 400 ml. of 95% ethanol was then added and stirring was continued under water-pump vacuum to remove the remainder of the sulfur dioxide. The product thus obtained was an ethanol solution of sulfated pentaethylene glycol ether of 2-butyloctanol-1.

Neutralization of a portion of this solution of the sulfated product with monoethanolamine and subsequent drying in a stirred reactor at a temperature of 60–65° C./13mm., for 30 minutes gave the substantially pure monoethanolamine salt of sulfated pentaethylene glycol ether of 2-butyloctanol-1, a viscous liquid. It is designated as II–1 in the tests reported in Example 3.

Neutralization of another portion of the sulfated material with diethanolamine and subsequent drying as above gave the substantially pure diethanolamine salt of sulfated pentaethylene glycol ether of 2-butyloctanol-1, also a viscous liquid. It is designated as II–2 in the tests reported in Example 3.

Still another portion of the sulfated material was similarly neutralized with triethanolamine and subsequently dried to yield the triethanolamine salt of sulfated pentaethylene glycol, designated as II–3 in the tests of Example 3.

Example 3

Relative detergency may be measured by any quantitative method; however for the purpose of evaluating the present and related products I have used the method described by Jay C. Harris in Soap and Sanitary Chemicals for August and September 1943. By the application of this method it is possible to evaluate the detergency of a product in terms of any standard detergent. For convenience I have compared the detergency of the present and related products with the detergency of Gardinol WA, which is a commercial detergent produced by sulfating the alcohols derived by hydrogenation of coconut oil fatty acids.

The detergency of the present products of Examples 1 and 2 and a related product as determined by the Harris method is illustrated in the following table:

| Product Tested | Detergency, Percent of Gardinol | | | |
|---|---|---|---|---|
| | 100% Active | | Built[1] | |
| | 50 p. p. m. | 300 p. p. m. | 50 p. p. m. | 300 p. p. m. |
| I-1 | 64 | 83 | 88 | 96 |
| I-2 | 64 | 75 | 100 | 96 |
| I-3 | 65 | 76 | 91 | 87 |
| II-1 | 98 | 98 | 104 | 92 |
| II-2 | 96 | 97 | 102 | 98 |
| II-3 | 83 | 95 | 91 | 95 |
| Sodium 2-Butyloctanol-1 sulfate | 37 | 30 | 86 | 104 |

[1] The builder consisted of 40 parts of tetrasodium pyrophosphate, 40 parts of starch for each 20 parts of the active constituent.

The speed of wetting, as measured by the Draves test of the products of Examples 1 and 2 when dissolved in water to form solutions of the indicated concentrations gave the values shown below. Similarly obtained values for sodium 2-butyloctanol-1 sulfate are included for purposes of comparison.

| Product Tested | Draves Wetting (Seconds at percent Concentration) | | | |
|---|---|---|---|---|
| | 0.5 | 0.25 | 0.125 | 0.062 |
| I-1 | Inst. | 3.1 | 8.8 | 37.4 |
| I-2 | Inst. | 3.8 | 11.1 | 35.8 |
| I-3 | Inst. | 4.8 | 14.6 | 53.6 |
| II-1 | Inst. | 4.4 | 10.4 | 37.2 |
| II-2 | | 2.5 | 5.0 | 14.1 | 46.4 |
| II-3 | | 2.7 | 5.1 | 16.7 | 51.0 |
| Sodium 2-butyloctanol-1 sulfate | Inst. | 4.8 | 33.6 | 180+ |

Evaluation of the foaming properties of the products of Examples 1 and 2 as measured by the Ross-Miles lather test (proposed method of the American Society for Testing Materials) gave the following values:

| Product Tested | Ross-Miles Lather Heights (cm.) | | | |
|---|---|---|---|---|
| | 50 p. p. m. | | 300 p. p. m. | |
| | At Once | 5 min. | At Once | 5 min. |
| I-1 | 13.8 | 11.0 | 14.2 | 11.0 |
| I-2 | 13.2 | 11.0 | 13.8 | 11.8 |
| I-3 | 12.8 | 7.8 | 13.2 | 11.0 |
| II-1 | 16.5 | 16.0 | 17.0 | 17.0 |
| II-2 | 16.0 | 13.2 | 16.5 | 15.5 |
| II-3 | 16.0 | 15.0 | 16.5 | 16.0 |

What I claim is:

1. Chemical compounds having the general formula

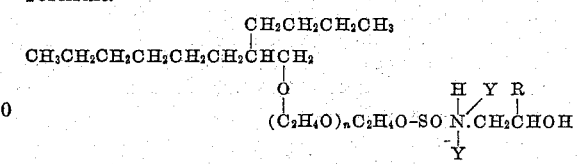

in which $n$ is an integer having a value of at least 2, but not in excess of 10, R is selected from the class consisting of hydrogen and the methyl radical, and Y is selected from the class consisting of hydrogen and the radical $$-CH_2CHOH$$
$$\phantom{-CH_2C}\overset{|}{R}$$

2. Chemical compounds having the formula

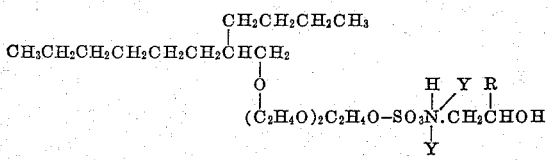

in which R is selected from the class consisting of hydrogen and the methyl radical and Y is selected from the class consisting of hydrogen and the radical $$-CH_2CHOH$$
$$\phantom{-CH_2C}\overset{|}{R}$$

3. Chemical compounds having the formula

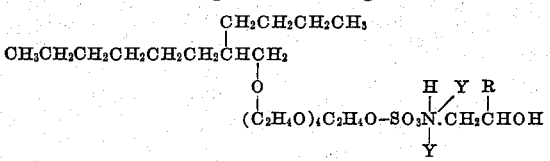

in which R is selected from the class consisting of hydrogen and the methyl radical and Y is selected from the class consisting of hydrogen and the radical $$-CH_2CHOH$$
$$\phantom{-CH_2C}\overset{|}{R}$$

4. The chemical compound having the formula

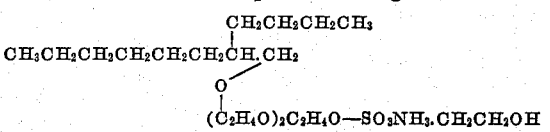

5. The chemical compound having the formula

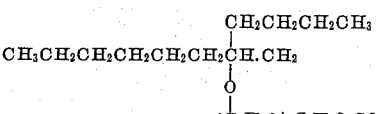

6. The chemical compound having the formula

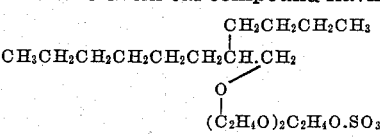

7. The chemical compound having the general formula

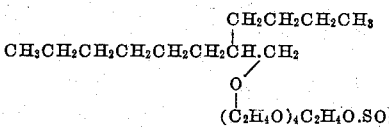

8. The chemical compound having the general formula

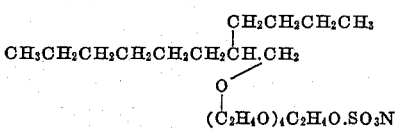

MILTON KOSMIN.

References Cited in the file of this patent

UNITED STATES PATENTS

| Number | Name | Date |
|---|---|---|
| 1,970,578 | Schoeller et al. | Aug. 21, 1934 |
| 2,174,761 | Schuette | Oct. 3, 1939 |
| 2,212,521 | Harris | Aug. 27, 1940 |

FOREIGN PATENTS

| Number | Country | Date |
|---|---|---|
| 810,382 | France | Mar. 20, 1937 |